(12) United States Patent
Rikhof et al.

(10) Patent No.: US 8,235,464 B2
(45) Date of Patent: Aug. 7, 2012

(54) CHILD SEAT

(75) Inventors: Johannes Henderikus Rikhof, Beuningen (NL); Hendricus Johannes Vertegaal, Hengelo (NL); Willem Mees Van der Bijl, Enschede (NL); Rob Cristian Heinemeijer, Hengelo (NL)

(73) Assignee: HTS Hans Torgersen & Sons, Kroderen (NO)

( * ) Notice: Subject to any disclaimer, the term of this patent is extended or adjusted under 35 U.S.C. 154(b) by 318 days.

(21) Appl. No.: 12/663,850

(22) PCT Filed: Jun. 12, 2008

(86) PCT No.: PCT/NO2008/000211
§ 371 (c)(1),
(2), (4) Date: Dec. 10, 2009

(87) PCT Pub. No.: WO2008/153412
PCT Pub. Date: Dec. 18, 2008

(65) Prior Publication Data
US 2010/0156157 A1    Jun. 24, 2010

(30) Foreign Application Priority Data

Jun. 12, 2007 (GB) .................................. 0711368.1
Jul. 13, 2007 (GB) .................................. 0713664.1

(51) Int. Cl.
*B60N 2/28* (2006.01)
(52) U.S. Cl. .......................... 297/256; 297/353; 297/410
(58) Field of Classification Search ............... 297/250.1, 297/256.1, 256.11, 353, 410, 411.36
See application file for complete search history.

(56) References Cited

U.S. PATENT DOCUMENTS
4,015,878 A * 4/1977 Perkins .......................... 297/353
(Continued)

FOREIGN PATENT DOCUMENTS
EP        0751033       7/1997
WO    WO 2004/000602   12/2003

*Primary Examiner* — Peter R. Brown
(74) *Attorney, Agent, or Firm* — Christian D. Abel

(57) ABSTRACT

Seat to accommodate a child in a vehicle, the seat being adapted for secure connection to the vehicle e.g. to a conventional forward facing vehicle seat for an adult; the seat having a support portion (10) on which a child may sit, a rear portion (11) configured to restrict movements of the back of the child, and a headrest (12) configured to restrict movements of the back of the head of the child, in which a first upright member (15) is connected to a rear part of [or a rear extension to] the support portion (10) and a second upright member (16) is connected to a rear part of [or a rear extension to] the headrest (12), the upright members (15 and 16) being parallel to each other, and in which there is adjustment means to adjust the relative position of the headrest with respect to the support portion, the adjustment means comprising a rotary member (19) rotatable about a horizontal axis fixed with respect to the rear portion (11), the rotary member (19) having grips (27, 28) at its ends projecting sideways from the support portion within or behind the support portion and projecting detents (21,22) between the grips, the detents (21, 22) being arranged to engage facing slots (15*a* and 16*a*) of identical pitch apart in the first and second upright members, the arrangement being such that when the rotary member (19) is turned by the grips (27, 28), the rear portion (11) is raised by the pitch of the slots (15*a* and 16*a*), and the headrest (12) is raised by twice the pitch of the slots.

10 Claims, 3 Drawing Sheets

U.S. PATENT DOCUMENTS

| | | | | |
|---|---|---|---|---|
| 4,545,617 A | * | 10/1985 | Drexler et al. | 297/340 |
| 5,695,245 A | * | 12/1997 | Carlson et al. | 297/314 |
| 6,447,062 B1 | | 9/2002 | Jaekel et al. | |
| 6,491,348 B1 | * | 12/2002 | Kain | 297/484 |
| 6,811,216 B2 | * | 11/2004 | Sedlack | 297/250.1 |
| 7,669,926 B2 | * | 3/2010 | Balensiefer | 297/256.11 |

* cited by examiner

CHILD SEAT

The invention relates to a child restraint seat to be fixed in a vehicle.

Many forms of child restraint seats are known. Some are specifically designed so that configuration of the seat can be changed over time to suit the dimensions of a growing child. In growing children, it is generally recognized that the height above a seat needed for a head support increases at about twice the rate of increase of the height above the seat needed for a back support For instance, European patent specification EP 0,751,033 A2 shows a child restraint seat having a headrest, with an arrangement to raise the headrest with respect to the remainder of the seat.

International patent publication WO 2004/000602 A1 shows a child restraint seat having provision for adjustment by pulling the headrest upwardly with respect to the remainder of the seat. The headrest is supported on an upright member which is connected to the back of the seat with a ratchet arrangement. In this way, during adjustment, the headrest can be raised further with respect to the base of the seat than the backrest part of the seat. Expansion of the seat is effected by pulling upwardly on the headrest.

U.S. Pat. No. 6,447,062 B1 shows a child restraint seat having provision for adjustment by a double rack and pinion mechanism operated by hand turned knurled wheels. The rack and pinion arrangement is such that the headrest is raised twice as fast as the backrest with respect to the base of the seat.

The invention provides a seat to accommodate a child in a vehicle, the seat being adapted for secure connection to the vehicle e.g. to a conventional forward facing vehicle seat for an adult; the seat having a support portion on which a child may sit, a rear portion configured to restrict movements of the back of the child, and a headrest configured to restrict movements of the back of the head of the child, in which a first upright member is connected to a rear part of [or a rear extension to] the support portion and a second upright member is connected to a rear part of [or a rear extension to] the headrest, the upright members being parallel to each other, and in which there is adjustment means to adjust the relative position of the headrest with respect to the support portion, the adjustment means comprising a rotary member rotatable about a horizontal axis fixed with respect to the rear portion, the rotary member having grips at its ends projecting sideways from the support portion within or behind the support portion and projecting detents between the grips, the detents being arranged to engage facing slots of identical pitch apart in the first and second upright members, the arrangement being such that when the rotary member is turned by the grips, the rear portion is raised by the pitch of the slots, and the headrest is raised by twice the pitch of the slots.

In one form it is preferred that the rotary member includes a frame with spaced apart parallel bars incorporating the detents disposed to engage the slots in the upright members.

In this form the upright members may be disposed centrally between extremities of the rotary member. Alternatively, pairs of upright members may be disposed on either side of the detents on the rotary member.

In another form it is preferred that the rotary member includes a plate of which the edges are disposed to engage the slots in the upright members.

The grips at the ends of the rotary member are preferably hand grips, but the grips at the ends of the rotary member might be keyways configured to accept inserted tools to effect rotation of the rotary member.

In one preferred form, the spacing of the detents is independent of the spacing of the slots, and the upright members are resiliently biased towards each other, so that rotation of the grips will first force the upright members apart and then allow them to come together again, so to raise the rear portion by the pitch of the slots and the headrest by twice the pitch of the slots.

In an alternative preferred form, the detents are spaced apart by the same distance as the pitch of the slots, and the depths of the slots are sufficient to accept the detents without forcing the upright members apart, so that rotation of the grips will raise the rear portion by the pitch of the slots and the headrest by twice the pitch of the slots.

It is generally preferred that the seat had additionally a restraint strap or web adapted to be disposed across the front of a child sitting in the seat and securely fixed to sides of the vehicle seat or fixed points on the body of the vehicle.

In this description the terms 'upright' and 'horizontal' relate to a situation in which the child restraint seat is installed in a vehicle. Generally, the seat will be inclined so that the child can lean slightly backwards, and so feel secure that he/she will not be tipped out of the seat. Under current legislation in many jurisdictions, it is mandatory for the child to be secured in the seat, and so restraint webs or straps can be assumed to be in place to secure the child to the seat.

Two specific embodiments of the invention will now be described by way of example with reference to the accompanying drawings, in which.

Figure 1:
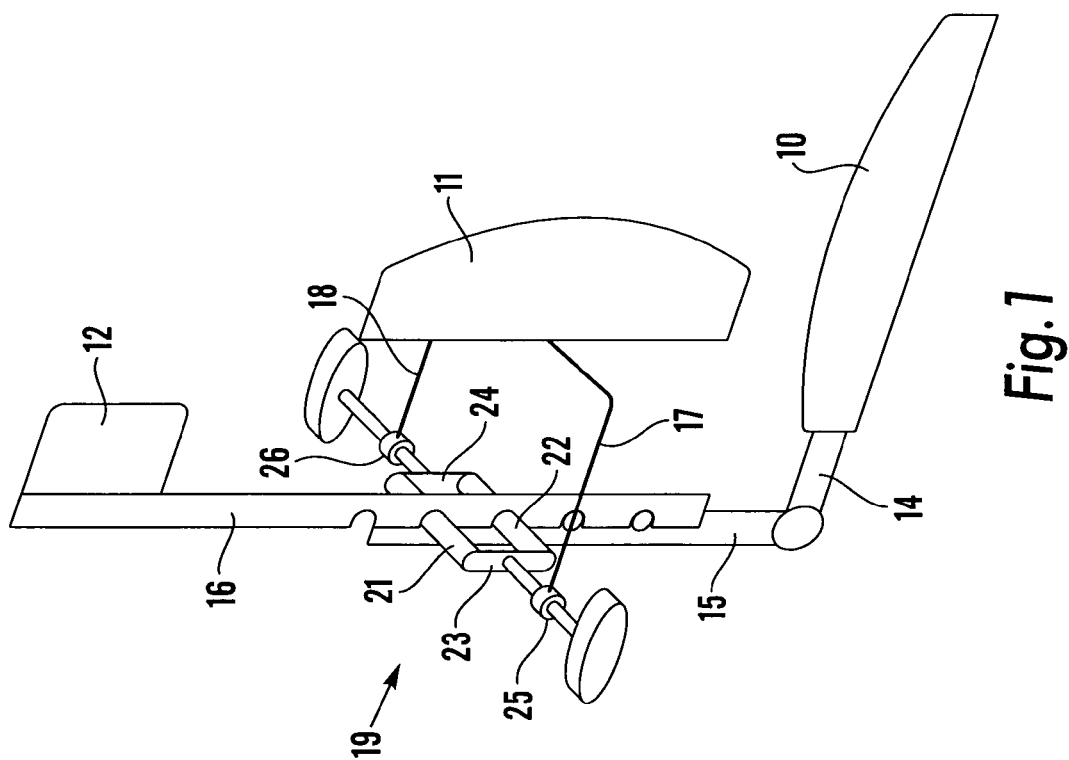
FIG. 1 is a diagrammatic perspective view of a seat in a usable configuration.

As shown in FIG. 1, (illustrating a first embodiment of the invention) a child restraint seat has a support portion 10 upon which a child may sit, a rear portion 11 to restrict backward movement of the child's back, and a headrest 12 to restrict backward movement of the child's head.
There is a backwardly extending arm 14 projecting back from the support portion.

The arm 14 is connected a first upright member 15. Extending downwardly from behind the headrest 12 there is a second upright member 16.

Figure 2:
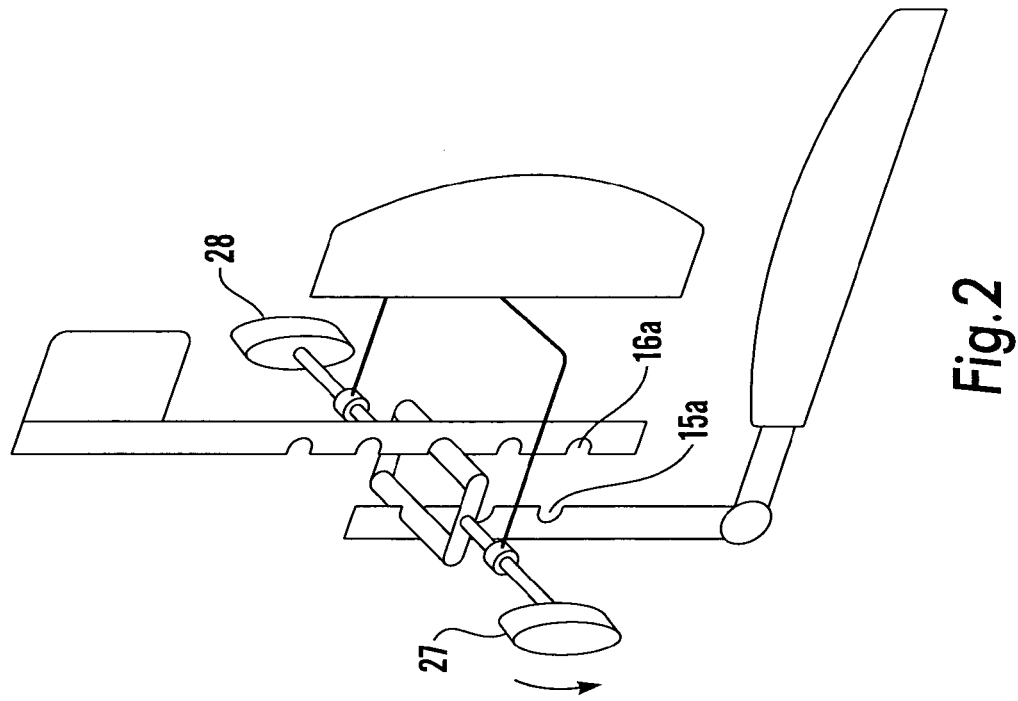
FIG. 2 is a similar view showing relative movement of the component parts.

The upright members 15 and 16 are resiliently urged together (by means not shown), and have corresponding slots 15a and 16a (better seen in FIG. 2). When the upright members 15 and 16 are abutting each other, the slots 15a and 16a are arranged to be adjacent to each other, so to form generally circular apertures. The slots 15a and 16a are set at a constant pitch (distance apart) along their respective upright members 15 and 16.

The rear portion 11 has two arms 17 and 18 extending rearwardly, each supporting a trunnion (17a and 18a respectively).

Following the invention, there is a rotary member 19 constrained by the trunnions 17a and 18a for rotary movement about a horizontal axis defined by the trunnions.

The rotary member has spaced apart bars 21 and 22 parallel to and equidistant from the horizontal axis. The bars 21 and 22 form detents to engage the slots 15a and 16a. These bars are distanced from each other by the pitch of the slots 15a and 16a in the upright members 15 and 16. The bars 21 and 22 are connected by spacer members 23 and 24 to spindles 25 and 26 which are rotatable in the trunnions 17a and 18a. At the ends of the spindles 25 and 26 there are grips 27 and 28, by which the rotatable member 19 can be rotated.

FIG. 1 shows the upright members 15 and 16 closed up so that the generally circular apertures surround the bars 21 and 22 of the rotary member 19. In this configuration the seat is ready to accommodate a child in the vehicle.

Assuming that the child for whom the seat was intended was of a minimum size to be restrained in the seat when the seat was first acquired, growth of the child will create a requirement for the seat to be enlarged.

FIG. 2 shows how the rear portion 11 and headrest 12 are raised from the support portion 10 to effect enlargement. The grips 27 and 28 are rotated so that the upright members are forced apart against the resilience urging them together. (See rotary arrow on grip 27.) As rotation of the grips 27 and 28 is continued, the bar 22 rotates about the bar 21. Thus the bar 22 lifts the headrest 12 on top of the second upright member 16 by twice the distance between the slots 15a and 16a. At the same time the rotary member 19 (comprising the assembly of spacer bars 21 and 22, spacer members 23 and 24, spindles 25 and 26, and grips 27 and 28) is raised by the single distance between the slots 15a and 16a. Thus the bar 21 is raised at half the rate by which the bar 22 is raised.

In this way the headrest 12 for the child is raised at twice the rate of the back support 11 for the child.

Figure 3:
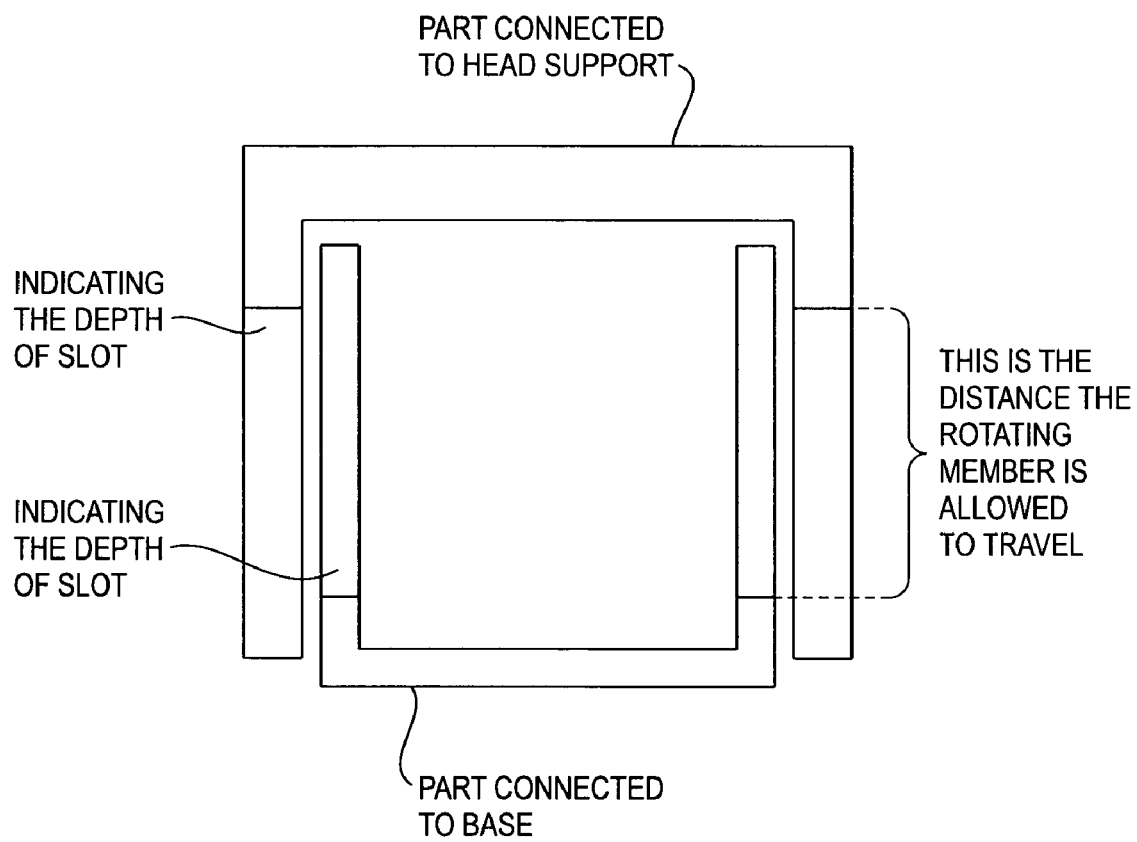
FIG. 3 is a diagrammatic side view of a seat back of another seat.
Figure 4:
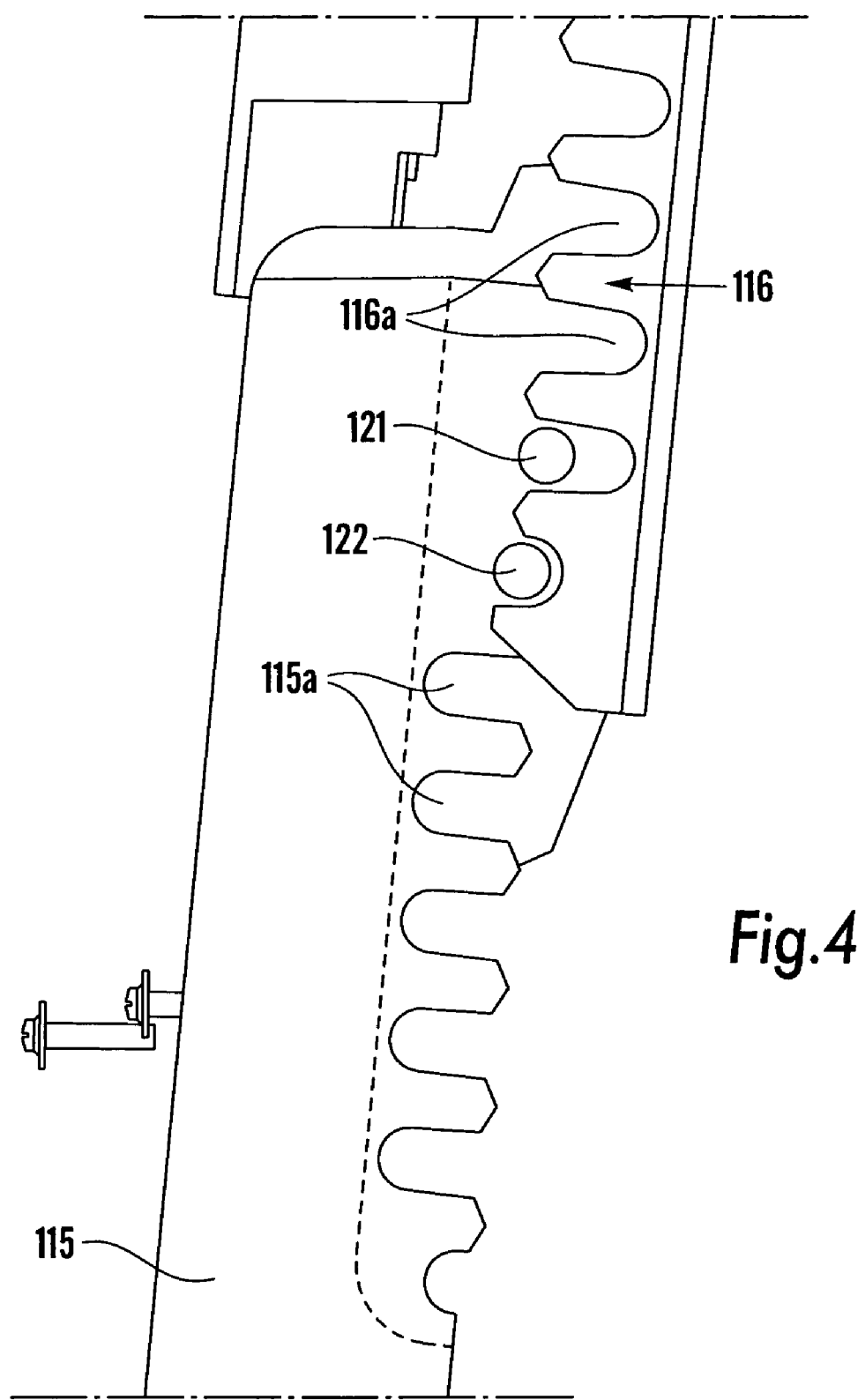
FIG. 4 is a sectional illustration of a mechanism for that other seat.

FIGS. 3 and 4 illustrate a second embodiment of the invention. As shown in FIG. 1 the upright part of a child's seat has a part 100 connected to base (not shown), and a part 102 connected to a headrest (not shown). The part 100 is connected to first upright members 115, and the part 102 is connected to second upright members 116. The upright members are arranged for relative vertical movement with respect to each other.

The upright members effectively define between them a back for the seat.

As shown more particularly in FIG. 4, the upright members 115 have slots 115a, and the upright members 116 have slots 116a. The slots are of the same dimensions, and the depths of the slots correspond to the 'pitch' or distance between the slots. The vertical extent of the slots in the upright members is shown by the dimensional arrows in FIG. 3.

A rotary member (not shown, but corresponding to 19 in FIGS. 1 and 2) has spaced apart bars 121 and 122 parallel to and equidistant from the horizontal axis.

These bars rotate about the axis of the rotary member, and engage alternately in the slots 115a and 116a.

Rotation of the rotary member, and so the bars 121 and 122, causes the bars to engage with the slots, and to move the upright members 116 vertically with respect to upright members 115, which remain at the same base level. As the rotary member rotates, its axis rises by the pitch of the slots, and the headrest attached to the members 116 rises by twice the pitch of the slots.

The rotary member and bars 121 and 122 are connected to the back for the child's seat. In this way the headrest for the child is raised at twice the rate of the back of the child's seat.

The invention claimed is:

1. Seat to accommodate a child in a vehicle, the seat being adapted for secure connection to the vehicle; the seat having a support portion on which a child may sit, a backrest portion configured to restrict movements of the back of the child, and a headrest configured to restrict movements of the back of the head of the child, in which a first upright member is connected to a rear part of, or a rear extension to, the support portion and a second upright member is connected to a rear part of, or a rear extension to, the headrest, the upright members being parallel to each other, and in which there is adjustment means to adjust the relative position of the headrest with respect to the support portion, the adjustment means comprising a rotary member rotatable about a horizontal axis fixed with respect to the rear portion, the rotary member having grips at its ends projecting sideways from the support portion within or behind the support portion and projecting detents between the grips, the detents being arranged to engage facing slots of identical pitch apart in the first and second upright members, the upright members being resiliently biased towards each other, the arrangement being such that when the rotary member is turned by the grips, the detents, through the rotation of the rotary member and being in engagement with facing slots, will first force the upright members apart, and then lift the first upright member relative the second upright member, whereafter the detents will allow the first and second upright members to come together again, the rotation causing the rear portion to raise the distance between two adjacent slots and the headrest by twice the distance between two adjacent slots.

2. Seat as claimed in claim 1, wherein the rotary member includes a frame with spaced apart parallel bars incorporating the detents disposed to engage the slots in the upright members.

3. Seat as claimed in claim 2, wherein the upright members are disposed centrally between extremities of the rotary member.

4. Seat as claimed in claim 2, wherein pairs of upright members are disposed on either side of the detents on the rotary member.

5. Seat as claimed in claim 4, wherein the detents are spaced apart by the same distance as the pitch of the slots, and the depths of the slots are sufficient to accept the detents without forcing the upright members apart so that rotation of the grips will raise the rear portion by the pitch of the slots and the headrest by twice the pitch of the slots.

6. Seat as claimed in claim 1, wherein the rotary member includes a plate of which the edges are disposed to engage the slots in the upright members.

7. Seat as claimed in any one of the preceding claims, wherein the grips at the ends of the rotary member are hand grips.

8. Seat as claimed in claim 7, wherein the grips at the ends of the rotary member are keyways configured to accept inserted tools to effect rotation of the rotary member.

9. Seat as claimed in claim 1, and having additionally a restraint strap or web adapted to be disposed across the front of a child sitting in the seat and securely fixed to sides of the vehicle seat or fixed points on the body of the vehicle.

10. Seat as claimed in claim 1 in which the seat is adapted for secure connection to a conventional forward facing vehicle seat for an adult.

* * * * *